United States Patent
Yamaishi

(10) Patent No.: US 10,036,623 B2
(45) Date of Patent: Jul. 31, 2018

(54) METHOD FOR MEASURING BEARING CUP GAP IN UNIVERSAL JOINT AND METHOD FOR MANUFACTURING UNIVERSAL JOINT TO WHICH THE MEASURING METHOD IS APPLIED

(71) Applicant: JTEKT CORPORATION, Osaka-shi (JP)

(72) Inventor: Hiroaki Yamaishi, Nukata-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 302 days.

(21) Appl. No.: 14/946,038

(22) Filed: Nov. 19, 2015

(65) Prior Publication Data
US 2016/0146261 A1   May 26, 2016

(30) Foreign Application Priority Data
Nov. 25, 2014 (JP) .................................. 2014-237864

(51) Int. Cl.
| | |
|---|---|
| *F16D 3/40* | (2006.01) |
| *G01B 5/14* | (2006.01) |
| *F16D 3/38* | (2006.01) |

(52) U.S. Cl.
CPC .............. *G01B 5/14* (2013.01); *F16D 3/382* (2013.01); *F16D 3/40* (2013.01); *F16D 2300/12* (2013.01)

(58) Field of Classification Search
CPC ... G01B 5/14; F16D 3/382; F16D 3/40; F16D 2300/12; F16D 3/387; F16D 3/41; F16D 3/385; B62K 21/06; B23P 19/04; F16C 21/005
See application file for complete search history.

(56) References Cited

U.S. PATENT DOCUMENTS

| | | | | |
|---|---|---|---|---|
| 4,704,782 A | * | 11/1987 | Spiess ..................... | B23P 19/04 29/407.05 |
| 2015/0275981 A1 | * | 10/2015 | Kobayashi .............. | F16D 3/385 29/898.06 |
| 2017/0089397 A1 | * | 3/2017 | Murata ................... | F16C 43/04 |

FOREIGN PATENT DOCUMENTS

JP  7-233820  9/1995

* cited by examiner

*Primary Examiner* — Jun Yoo
(74) *Attorney, Agent, or Firm* — Oblon, McClelland, Maier & Neustadt, L.L.P.

(57) ABSTRACT

Provided are a method for measuring a bearing cup gap in a universal joint that enables bearing cups to be easily and accurately assembled to a yoke member, and a manufacturing method for a universal joint, to which the measuring method is applied. The measuring method is used for a universal joint including a yoke member, bearing cups, and a joint spider member to measure gaps between bottom surfaces of the bearing cups and the joint spider member. The method includes acquiring first relationship data, acquiring second relationship data, acquiring a displacement amount of the pair of bearing cups, and calculating a gap between bottom surfaces of the bearing cups and end surfaces of a pair of shaft portions based on the first relationship data, the second relationship data, and the displacement amount.

4 Claims, 11 Drawing Sheets

F I G . 3
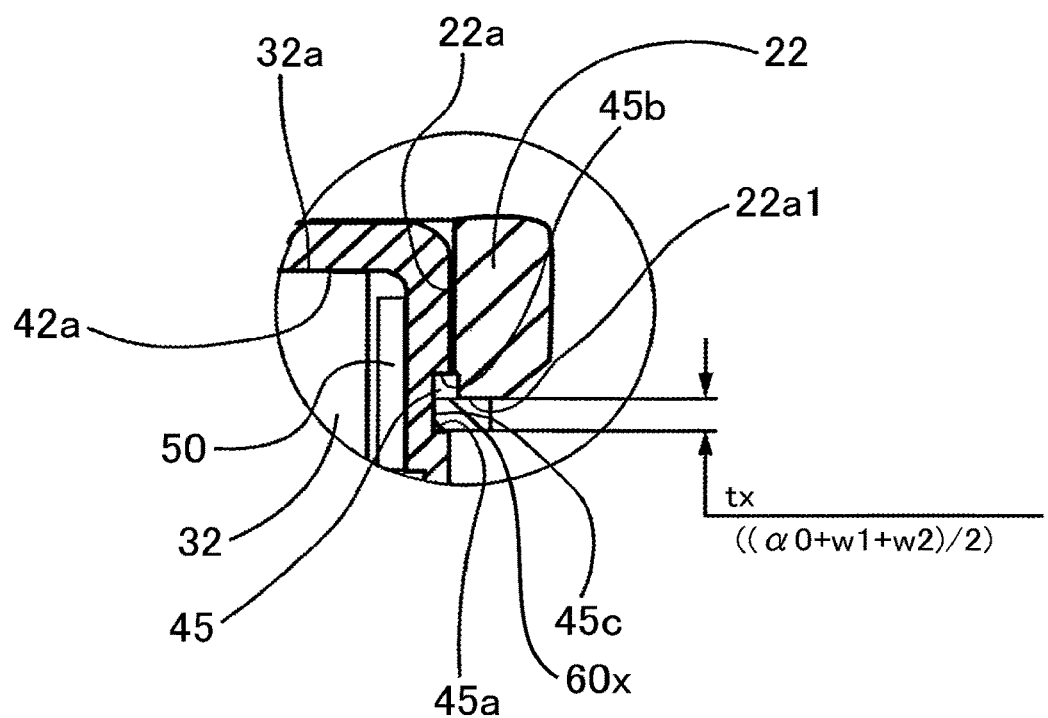

METHOD FOR MEASURING BEARING CUP GAP IN UNIVERSAL JOINT AND METHOD FOR MANUFACTURING UNIVERSAL JOINT TO WHICH THE MEASURING METHOD IS APPLIED

INCORPORATION BY REFERENCE

The disclosure of Japanese Patent Application No. 2014-237864 filed on Nov. 25, 2014 including the specification, drawings and abstract, is incorporated herein by reference in its entirety.

BACKGROUND OF THE INVENTION

1. Field of the Invention

The present invention relates to a measuring method for a bearing cup gap in a universal joint installed in, for example, a vehicle, and a method for manufacturing a universal joint to which the measuring method is applied.

2. Description of Related Art

For example, as a universal joint used for a drive shaft, a steering apparatus, or the like in a vehicle, a universal joint described in Japanese Patent Application Publication No. H7-233820 (JP H7-233820 A) is known. The universal joint described in JP H7-233820 A includes: a joint spider member 12 with four shafts 12a (shaft portions) arranged in the shape of a cross; and bottomed tube-like bearing cups 14 installed so as to be rotatable relative to the shafts. The bearing cups 14 are press-fitted into bearing holes having the same axis and formed in respective arms of a pair of arms extending in a bifurcated manner from a yoke main body portion of a yoke member such that the openings of the bearing cups 14 face each other. The coaxially arranged shafts 12a of the joint spider member 12 are each fitted in the corresponding bearing cup 14 via a resin plate.

In a technique described in JP H7-233820 A, when the bearing cups 14 are assembled in the bearing holes in the arms, first, an initial state is established where the shaft centers of the shafts 12a have been inserted into the bearing cups 14 and centered with respect to the yoke member. Then, the first bearing cup 14 is press-fitted into the bearing hole while the second bearing cup 14 is fixed. At this time, a jig with a strain gauge is attached to the joint spider member 12. The first bearing cup 14 is pushed and press-fitted in a direction from the first bearing cup toward the second bearing cup (hereinafter simply referred to as a second direction). Thus, an inner bottom surface of the first bearing cup 14 presses an end surface of the shaft 12a via the resin plate to allow the joint spider member 12 to start moving in the second direction. The moment of the movement can be detected based on an increase in output from the strain gauge of the jig. Then, the second shaft 12a moves in the second direction inside the second bearing cup 14 to eliminate the gap between: the second shaft 12a; and the resin plate and the bottom surface. The second shaft 12a further continues moving to compress the resin plate. A reaction force to the compression causes the second bearing cup 14 to press the second shaft 12a.

Then, the first bearing cup 14 is fixed, and the second bearing cup 14 is press-fitted into the bearing hole in the arm. The press fitting is continued until the output from the jig with the strain gauge returns to zero again. When the output reaches zero, the press fitting is ended. Thus, the position of the joint spider member 12 returns to an initial state where the joint spider member 12 is centered with respect to the yoke member again. At this time, the joint spider member 12 is subjected to even reaction forces to compressive loads, from the resin plates in the first and second bearing cups.

However, in the above-described conventional technique, the press fitting load applied when the bearing cup 14 is press-fitted into the bearing hole is not necessarily the same for the first bearing cup and for the second bearing cup. Consequently, during the press fitting of the bearing cups 14, a strain amount (displacement amount) of the joint spider member 12 in a press fitting direction may be different for the two arms. Therefore, when the press fitting load is released, the arms may be sprung back by a distance corresponding to the applied press fitting load, the shape and rigidity of each arm, and the like, resulting in a difference in size between gaps (bearing cup gaps) formed in the first bearing cup and in the second bearing cup. Thus, when the backlash is eliminated using snap rings selected on the assumption that the gap in the first bearing cup and the gap in the second bearing cup are equal, to regulate movement of the joint spider member 12 with respect to the yoke member, the shaft center of the joint spider member 12 may be displaced with respect to the yoke member.

SUMMARY OF THE INVENTION

An object of the present invention is to provide a method for measuring a bearing cup gap in a universal joint which method enables bearing cups to be easily and accurately assembled to a yoke member and a method for manufacturing a universal joint to which the measuring method is applied.

An aspect of the present invention relates to a method for measuring a bearing cup gap in a universal joint, the universal joint including: a yoke member including a yoke main body portion and a pair of arms extending in a bifurcated manner from the yoke main body portion and each having a holding hole formed therein; a pair of bearing cups shaped like bottomed tubes and press-fitted into the holding holes such that openings of the bearing cups face each other; and a joint spider member with a pair of shaft portions supported by the bearing cups so as to be able to swing. The measuring method measures gaps between bottom surfaces of the bearing cups and the joint spider member. The measuring method includes:

acquiring first relationship data that indicates a relationship between a first pressing load and a first deformation amount of the arms when, with the yoke member alone, the first pressing load is applied to the arms in an approaching direction in which the arms approach each other so that the arms are subjected to elastic bending deformation;

acquiring second relationship data that indicates a relationship between a second pressing load and a second deformation amount of the joint spider member and the bearing cups when, with the bearing cups fitted over the shaft portions, the second pressing load is applied to the bearing cups in an approaching direction in which the bearing cups approach each other so that the joint spider member and the bearing cups are subjected to elastic compressive deformation;

acquiring a displacement amount of the bearing cups when, with the bearing cups and the joint spider member assembled to the yoke member, a third pressing load is applied to the bearing cups in the approaching direction; and calculating gaps between the bottom surfaces of the bearing cups and end surfaces of the shaft portions based on the first relationship data, the second relationship data, and the displacement amount of the bearing cups.

In the above-described aspect, in order to measure the gaps between the bottom surfaces of the bearing cups and the end surfaces of the joint spider member in the universal joint, elastic bending deformation data on the arms alone (first relationship data) and elastic compressive deformation data on the joint spider member and the bearing cups (second relationship data) are acquired. Then, the third pressing load is actually applied to the bottom surfaces of the bearing cups, and the resultant deformation amount of the arms, the joint spider member, and the bearing cups is measured. At this time, the deformation amount includes the bending deformation amount of the arms (first relationship data), the compressive deformation amount of the joint spider member and the bearing cups (second relationship data), and the gaps between the bottom surfaces of the bearing cups and the joint spider member. Therefore, the bending deformation amount of the arms and the compressive deformation amount of the joint spider member and the bearing cups are subtracted from the displacement amount to allow determination of the gaps between the bottom surfaces of the bearing cups and the joint spider member. The measuring method based on the first relationship data, the second relationship data, and the displacement amount as described above allows the bearing cup gap between the bottom surfaces of the bearing cups and the joint spider member to be accurately and easily obtained.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3 is an enlarged view of a part S in FIG. 2;

DETAILED DESCRIPTION OF EMBODIMENTS

A method for measuring a bearing cup gap and a method for manufacturing a universal joint to which the measuring method is applied according to an embodiment of the present invention will be described below with reference to the drawings. First, with reference to FIG. 1 and FIG. 2, a universal joint 10 (also referred to as a cross joint) to be assembled according to the present invention will be described.

Figure 1:
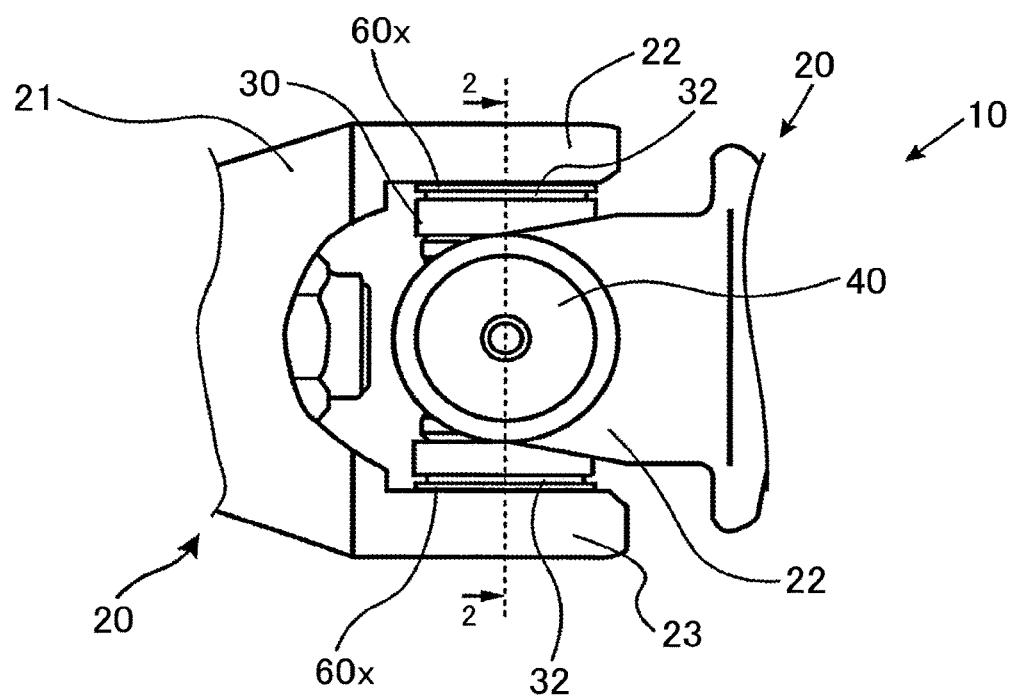
FIG. 1 is a plan view of a universal joint according to a present embodiment.
Figure 2:
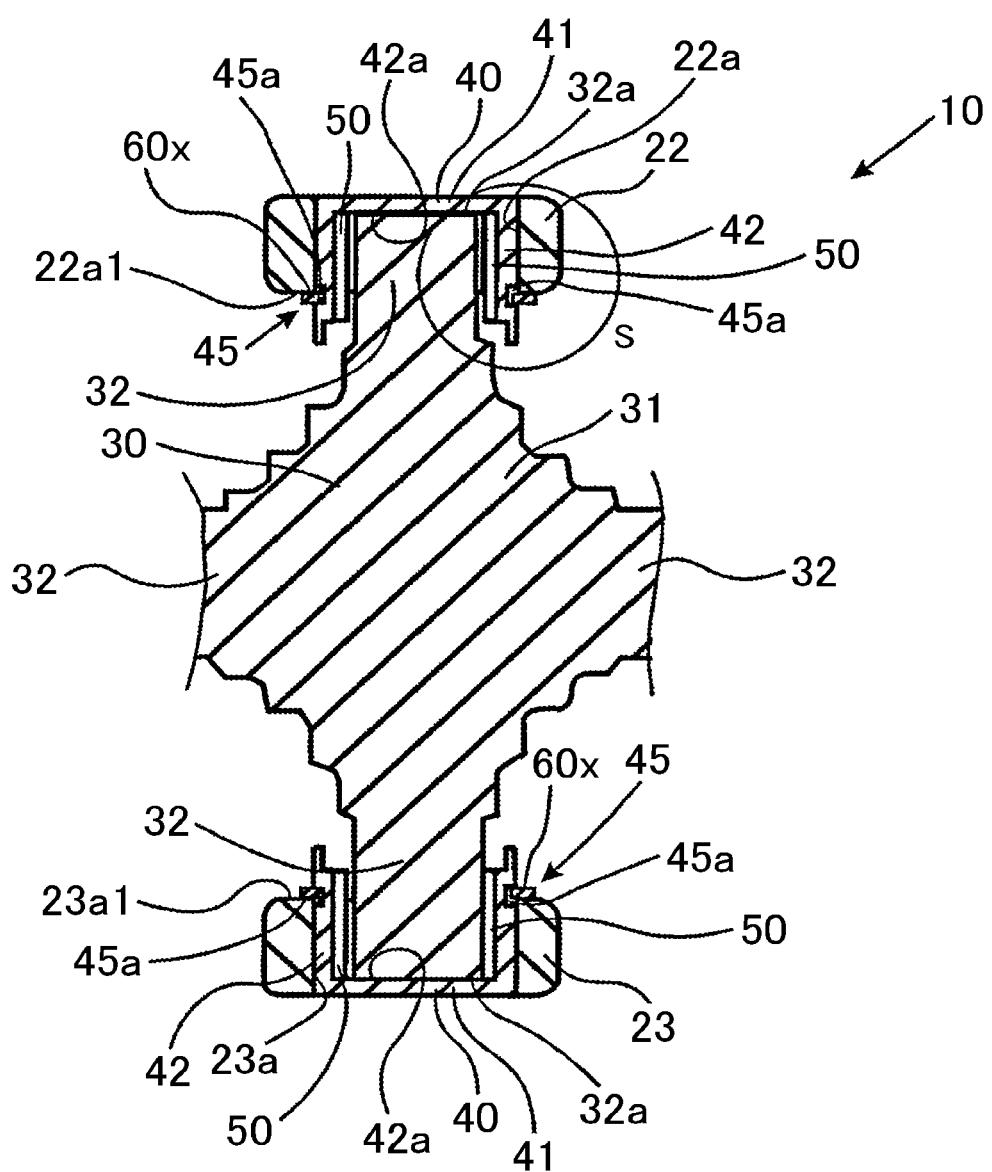
FIG. 2 is a sectional view taken along line 2-2 in FIG. 1.

As depicted in FIG. 1 and FIG. 2, the universal joint 10 includes yoke members 20, a joint spider member 30, bearing cups 40, needle bearings 50, and snap rings 60x (see FIG. 3). Of two sets of combinations each of the bearing cups and the joint spider member, only the combination of the bearing cups 40 and the joint spider member 30 depicted in a section in FIG. 2 will be described below.

As depicted in FIG. 1 and FIG. 2, the yoke member 20 includes a yoke main body portion 21 secured to a tip of a drive shaft (not depicted in the drawings) and a pair of arms 22 and 23 extending in a bifurcated manner from the yoke main body portion 21. Holding holes 22a and 23a are formed in the arms 22 and 23 and coaxially penetrate the arms 22 and 23, respectively.

As depicted in FIG. 2, the joint spider member 30 includes a block-like body portion 31 and four shaft portions 32. The shaft portions 32 protrude from four side peripheral surfaces of the body portion 31 in their respective directions so as to form a generally cross shape. The shaft portions 32 each have a circular section that is orthogonal to an axis thereof.

As depicted in FIG. 2, each of the bearing cups 40 is shaped like a bottomed tube. Each of the bearing cups 40 includes a tubular portion 42 and a bottom portion that occludes one end of the tubular portion 42. A groove 45 is formed in an outer peripheral surface of the tubular portion 42. As depicted in FIG. 3 that is an enlarged view of a part S in FIG. 2, the groove 45 includes an opening side surface 45a positioned closer to an opening in the bearing cup 40, a bottom portion side surface 45b positioned closer to the bottom portion 41 of the bearing cup 40, and a bottom surface 45c.

The bearing cups 40 are press-fitted into the holding holes 22a and 23a in the arms 22 and 23 such that openings of the bearing cups 40 face each other. When the universal joint 10 is in a state where the snap rings 60x are unassembled, in contrast to an assembly completion state, the grooves 45 in the outer peripheral surfaces of the bearing cups 40 form gaps with predetermined lengths w1 and w2 (groove portion dimensions) between the opening side surface 45a and an end surface 22a1 of the arm 22 and between the opening side surface 45a and an end surface 23a1 of the arm 23. The snap rings 60x with a selected plate thickness are fitted into the gaps. This will be described below in detail.

Needle bearings 50 are disposed along inner peripheral surfaces of the tubular portions 42 of the bearing cups 40. The needle bearings 50 each include a plurality of needle-like rollers arranged on the inner peripheral surface of the tubular portion 42 and a cage that holds the rollers such that the rollers are rotatable.

In an initial stage of the assembly, tip portions of the coaxially and linearly arranged shaft portions 32 of the joint spider member 30, depicted in FIG. 2, are inserted into the holding holes 22a and 23a in the arms 22 and 23, respectively. Subsequently, the bearing cups 40 are press-fitted into the holding holes 22a and 23a. At this time, the shaft portions 32 are each arranged at an inner periphery of the rollers of the needle bearing 50. In other words, the shaft portions 32 are each rotatably attached to the inner peripheral surface of the bearing cup 40 via the needle bearing 50.

This structure allows the two yoke members 20 to be coupled together so as to be each rotatable around a central axis of its holding holes.

The snap ring 60x is formed of metal and shaped like a ring with a circumference thereof cut at one position such that end surfaces thus formed are separated from each other. Before the assembly, snap rings 60x with different plate thicknesses tx are prepared. During the assembly, a snap ring with the optimum plate thickness tx is selected using a method described below. When the snap ring 60x is fitted into the grooves 45, a dedicated tool is used to grab opposite ends of the separated portions of the snap ring 60x to further separate the ends from each other. Then, the bottom surface 45c of the groove 45 is passed through the gap between the separated ends so that the snap ring 60x is fitted into the groove 45.

Figure 4:
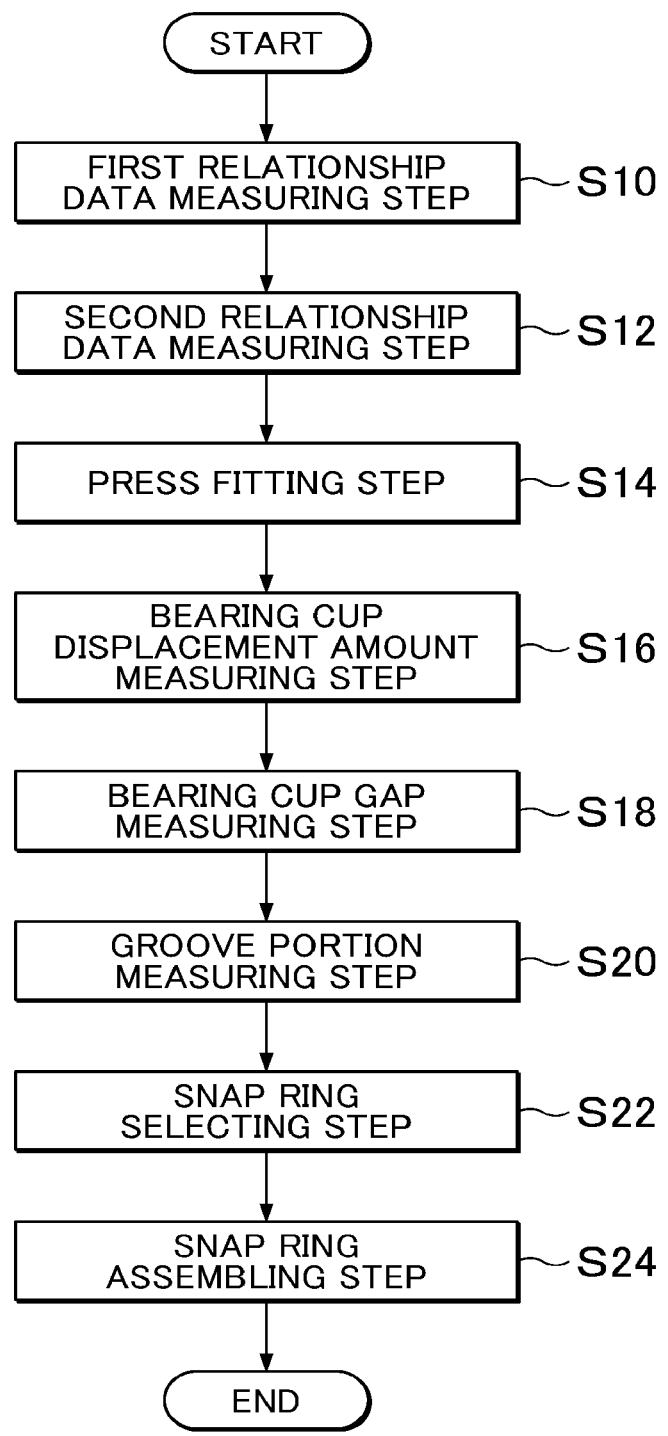
FIG. 4 is a flowchart of manufacturing steps according to the present embodiment.
Figure 5:
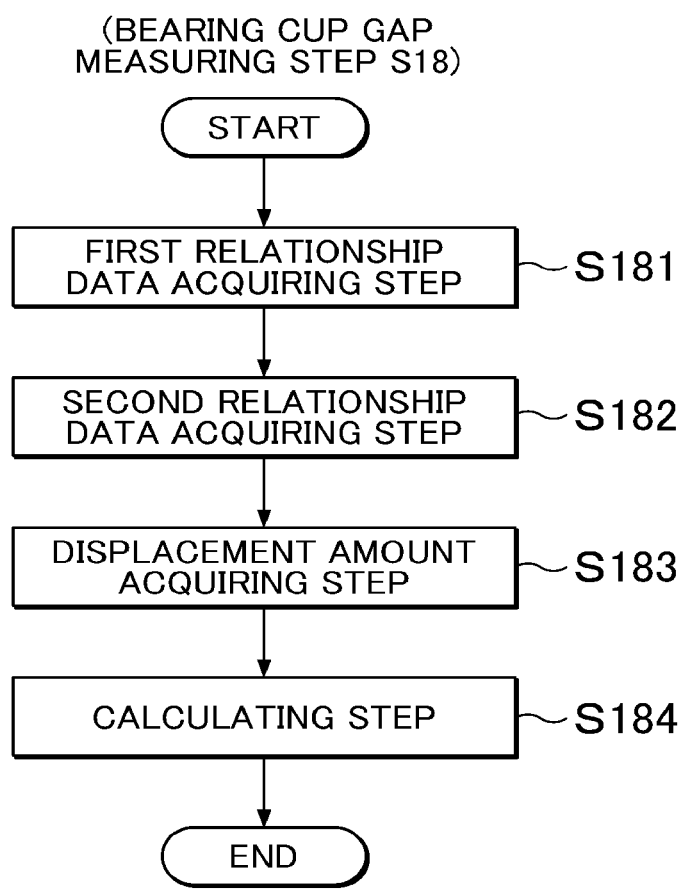
FIG. 5 is a flowchart of a measuring step of the manufacturing steps according to the present embodiment.

Now, a method for manufacturing the universal joint 10 will be described using flowcharts in FIG. 4 and FIG. 5. As depicted in FIG. 4, the steps of the manufacturing method include a first relationship data measuring step S10, a second relationship data measuring step S12, a press fitting step S14, a bearing cup displacement amount measuring step S16, a bearing cup gap measuring step S18, a groove portion measuring step S20, a snap ring selecting step S22, and a snap ring assembling step S24. The bearing cup gap measuring step S18 includes steps S181 to S184 described below (FIG. 5).

The first relationship data measuring step S10 involves acquiring an elastic bending deformation property of the arms 22 and 23 when, with the yoke member 20 alone, a first pressing load F1 is applied to the arms 22 and 23 in an approaching direction in which the arms 22 and 23 approach each other. The first pressing load F1 is any variable. Specifically, a group of first relationship data (filled circles in FIG. 10) is acquired which indicates a relationship between the first pressing load F1 and a first deformation amount observed when the first pressing load F1 is applied to the arms 22 and 23, which are thus subjected to elastic bending deformation of the first deformation amount. In the present embodiment, FEM analysis (finite element analysis) is executed based on material data on the yoke member 20 and the shape of the arms 22 and 23 to acquire the data group, which is then stored in a storage section not depicted in the drawings. However, the data acquiring method may be in any form. For example, specimens may be actually produced and experimented to acquire a group of first relationship data, which may then be stored in the storage section not depicted in the drawings.

The second relationship data measuring step S12 involves acquiring a group of second relationship data (filled squares in FIG. 10) that indicates a relationship between a second pressing load F2 and a second deformation amount observed when, with the bearing cups 40 fitted over the shaft portions 32 without the yoke member 20 and snap rings 60, the second pressing load F2 is applied to the bearing cups 40 in an approaching direction in which the bearing cups 40 approach each other. The second pressing load F2 is any variable. The second deformation amount is the amount of elastic compressive deformation to which the joint spider member 30 and the bearing cups 40 are subjected when the second pressing load F2 is applied to the joint spider member 30 and the bearing cups 40 in a compressing direction. In the present embodiment, the group of second relationship data is also pre-acquired by executing the FEM analysis (finite element analysis) based on material data on and the shapes of the bearing cups 40 and the shaft portions 32, and stored in a storage section not depicted in the drawings. However, the data acquiring method may be in any form as is the case with the above-described first relationship data measuring step S10.

Figure 6:
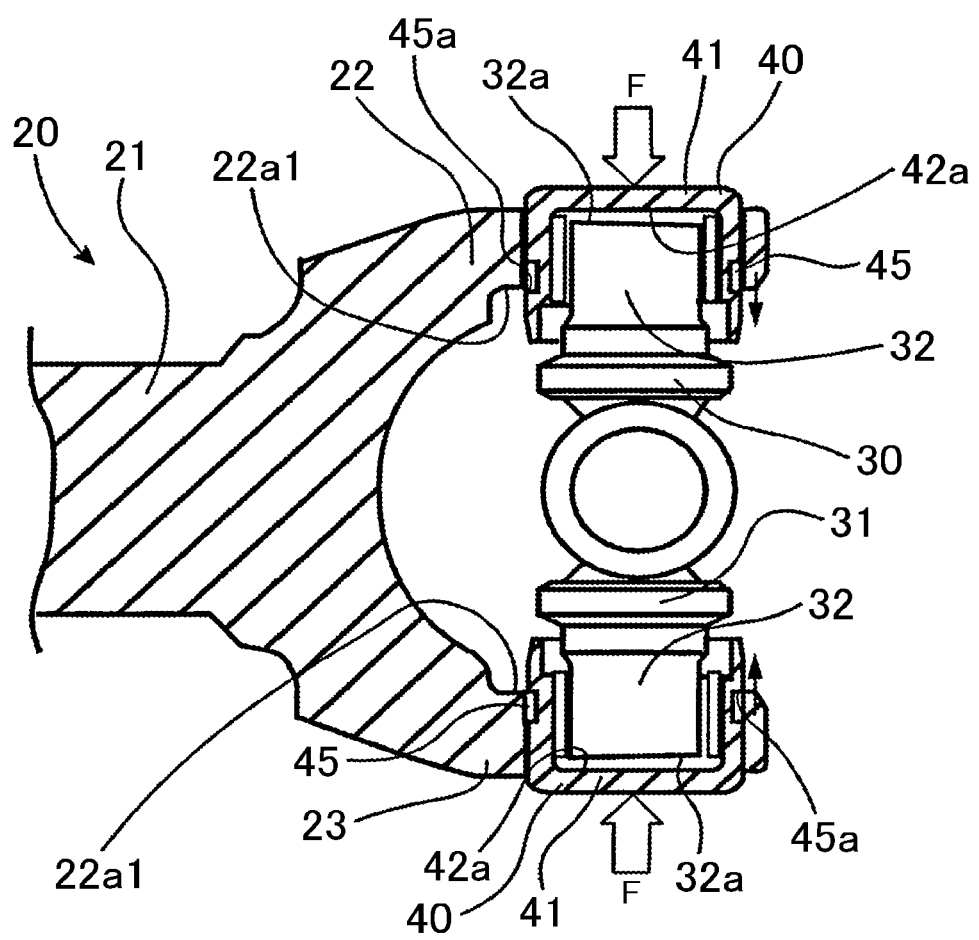
FIG. 6 is a sectional view taken along line 2-2 in FIG. 1 and illustrating the state of each portion at the time of press fitting of bearing cups.

Then, the press fitting step S14 starts in a state where the shaft portions 32 of the joint spider member 30 are inserted in the holding holes 22a and 23a in the arms 22 and 23 facing each other as depicted in FIG. 6. The bearing cups 40 are press-fitted into the holding holes 22a and 23a at a load F of, for example, 10 kN using a press machine such that the openings of the bearing cups 40 face each other. Consequently, tip portions of the shaft portions 32 are housed in the tubular portions 42 of the bearing cups 40. At this time, the bearing cups 40 with the openings facing each other are externally pushed at the bottom portions 41 and simultaneously press-fitted into the holding holes 22a and 23a.

Figure 7:
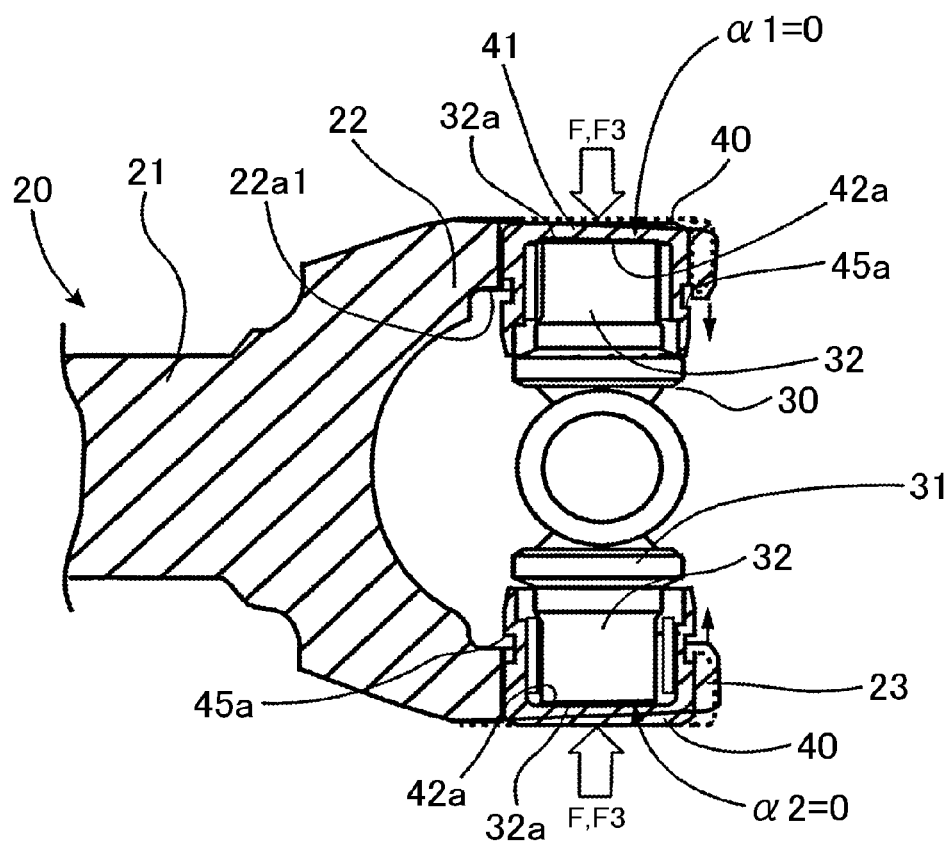
FIG. 7 is a sectional view taken along line 2-2 in FIG. 1 and illustrating a state where bottom surfaces of bearing cups and end surfaces of shaft portions of a joint spider member come into abutting contact with each other during the press fitting of the bearing cups.

Then, as depicted in FIG. 7, when the inner bottom surfaces 42a of the tubular portions 42 of the bearing cups 40 come into abutting contact with the end surfaces 32a of the shaft portions 32, the press fitting is stopped to release the press fitting load F. Whether or not the bottom surfaces 42a have come into abutting contact with the end surfaces 32a of the shaft portions 32 may be checked based on a rapid increase in press fitting load F. Furthermore, a displacement gauge may be provided to detect movement of each bearing cup 40 in an axial direction.

Figure 8:
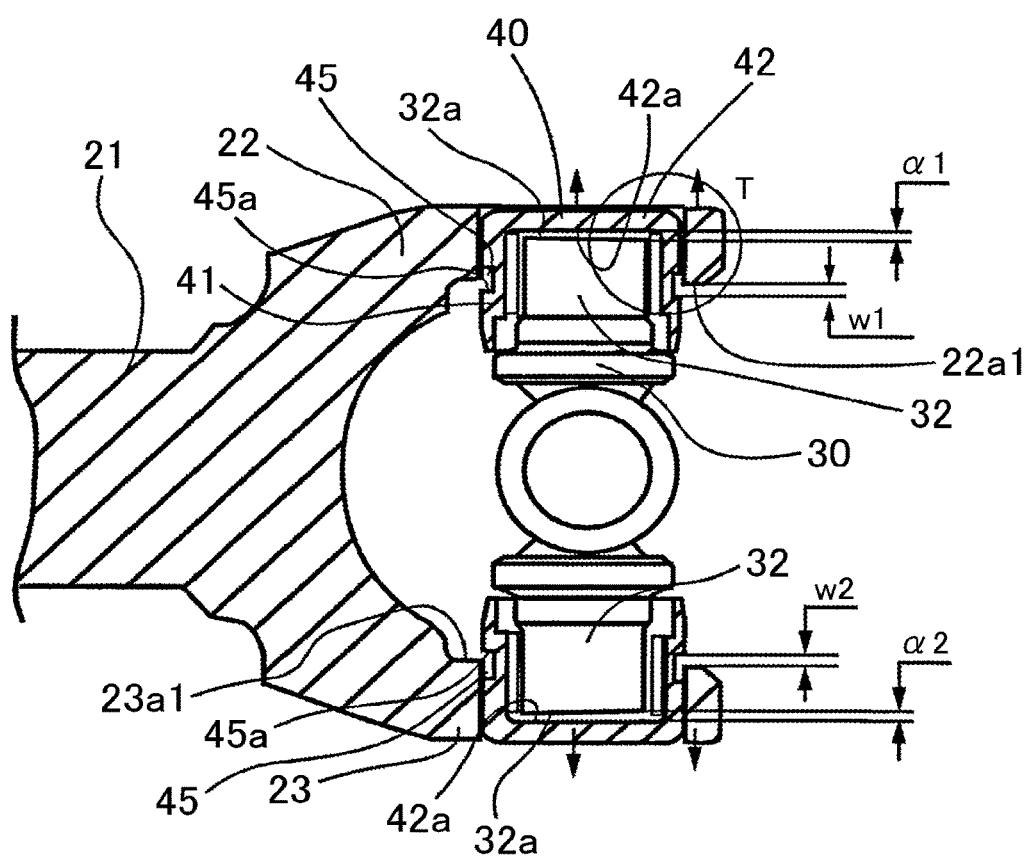
FIG. 8 is a sectional view taken along line 2-2 in FIG. 1 and illustrating an operational state of arms 22 and 23, the bearing cups, and the joint spider member at the time of release of a third pressing load F3 applied after the press fitting of the bearing cups.

Now, operations of the arms 22 and 23 during the press fitting of the bearing cups 40 will be described. When the bearing cups 40 are press-fitted into the holding holes 22a and 23a, the bearing cups 40 move relative to the holding holes 22a and 23a while gaps are present between the bottom surfaces 42a of the bearing cups 40 and the end surfaces 32a of the shaft portions 32. At the same time, the arms 22 and 23 are subjected to elastic bending deformation and flexed by a predetermined amount (see FIG. 7). Thus, when the press fitting of the bearing cups 40 into the holding holes 22a and 23a ends and the press fitting load F is subsequently released, the arms 22 and 23 are sprung back by an amount corresponding to the elastic bending deformation as depicted in FIG. 8. Consequently, the spring-back of the arms 22 and 23 results in gaps α1 and α2 between the bottom surfaces 42a of the bearing cups 40 and the end surfaces 32a of the shaft portions 32. The gaps α1 and α2 are hereinafter referred to as bearing cup gaps.

The bearing cup displacement amount measuring step S16 involves acquiring a displacement amount P by which the bearing cups 40 are displaced when, with the yoke member 20, the bearing cups 40, and the joint spider member 30 assembled together and with only the snap rings 60x unassembled, a third pressing load F3 (for example, 6 kN) is applied to the bearing cups 40 in the approaching direction in which the bearing cups 40 approach each other.

More specifically, the third pressing load F3 (for example, 6 kN) is applied to the end surfaces of the bottom portions 41 of the bearing cups 40 in the same direction in which the load is applied to the bearing cups 40 in the press fitting step S14. In this case, before the third pressing load F3 is applied, the bearing cup gaps α1 and α2 are present between the bottom surfaces 42a of the bearing cups 40 and end surfaces 32a of the shaft portions 32 housed in the bearing cups 40. Thus, when the bearing cups 40 are pushed with the third pressing load F3, first, the arms 22 and 23 run idly together with the bearing cups 40 by a distance corresponding to the gaps α1 and α2 and are subjected to elastic bending deformation. Subsequently, the bottom surfaces 42a of the bearing cups 40 come into abutting contact with the end surfaces 32a of the shaft portions 32. Then, the bottom portions 41 of the bearing cups 40 and the shaft portions 32 are subjected to elastic compressive deformation. In the bearing cup displacement amount measuring step S16, the displacement amount P of the bearing cups 40 is detected. The detected displacement amount P is stored in the storage section not depicted in the drawings.

In this case, the displacement amount P includes the bending deformation amount of the arms 22 and 23 (first relationship data), the compressive deformation amount of the end surfaces 32a of the shaft portions 32 and the bottom portions 41 of the bearing cups 40 (second relationship data), and the bearing cup gaps $\alpha 1$ and $\alpha 2$ that are gaps between the bottom surfaces 42a of the bearing cups 40 and the joint spider member 30. Therefore, the gaps between the bottom surfaces 42a of the bearing cups 40 and the end surfaces 32a of the shaft portions 32 can be accurately determined by subtracting the bending deformation amount of the arms and the compressive deformation amount of the shaft portions 32 and the bearing cups 40 from the displacement amount.

The displacement gauge used to measure the displacement amount P may be provided at any of the locations described below. For example, the displacement gauge may be provided at the opening side surface 45a of the groove 45 to detect the displacement of the opening side surface 45a of the groove 45. Alternatively, the displacement gauge may be provided at the arms 22 and 23 to detect the displacement of the arms 22 and 23. Alternatively, the displacement gauge may be provided at the end surface of the bearing cup 40 to detect the displacement of the end surface of the bearing cup 40.

The bearing cup gap measuring step S18 includes a first relationship data acquiring step S181, a second relationship data acquiring step S182, a displacement amount acquiring step S183, and a calculation step S184 as illustrated in FIG. 5. The first relationship data acquiring step S181 involves acquiring the first relationship data stored in the storage section. The second relationship data acquiring step S182 involves acquiring the second relationship data stored in the storage section. The displacement amount acquiring step S183 involves acquiring the displacement amount P stored in the storage section.

Figure 10:
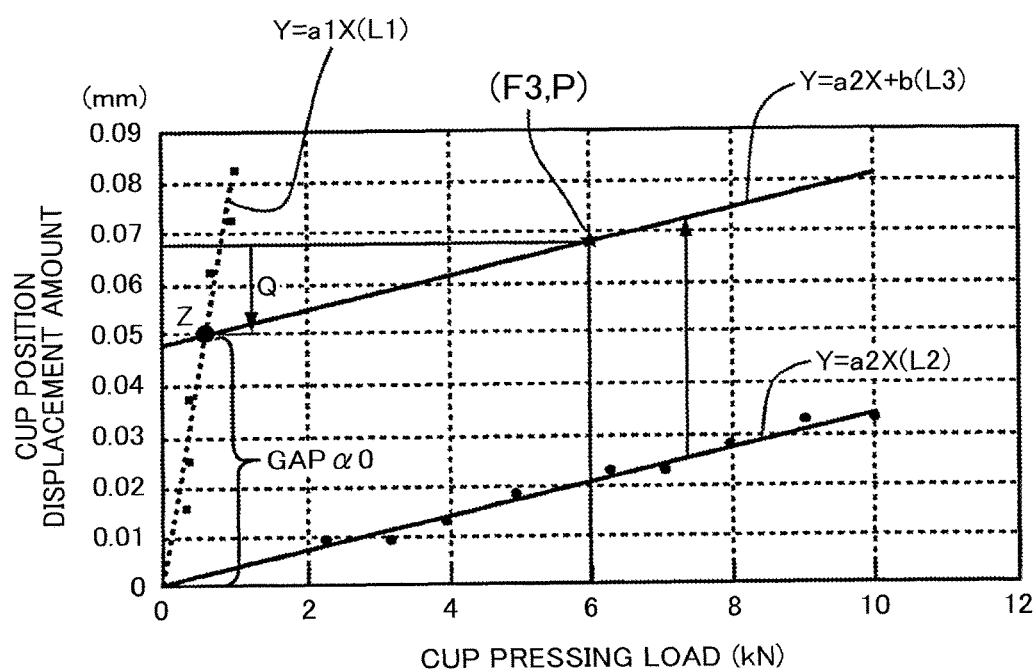
FIG. 10 is a graph showing a bearing cup pressing load and a cup position displacement amount.

The calculation step S184 involves linearly approximating the acquired group of first relationship data to calculate a first line L1 (Y=a1X) (see FIG. 10). In this case, the first line L1 may be determined by, for example, linearly regressing the acquired data group using the least squares method. Any calculation method may be used for the linear regression.

The calculation step S184 also involves linearly approximating the acquired group of second relationship data to calculate a second line L2 (y=a2X). More specifically, the second line L2 is calculated in order to determine the gradient a2 of the second line L2. Then, the calculation step S184 calculates a third line L3 (y=a2X+b) having the gradient a2 and passing through a point (F3, P) on a graph in FIG. 10 resulting from plotting of the applied third pressing load F3 and the acquired displacement amount P.

Moreover, the calculation step S184 involves calculating an intersection point Z between the calculated third line L3 (y=a2X+b) and the calculated first line L1 (y=a1X). In this case, the Y coordinate of the intersection point Z in FIG. 10 is the bearing cup gap $\alpha 0 (=\alpha 1+\alpha 2)$ resulting from the release of the third pressing load F3.

In the groove portion measuring step S20, groove portion dimensions w1 and w2 (see FIG. 8) of areas into which the snap rings 60x are fitted are measured using, for example, a vernier caliper. The groove portion dimension w1 is a dimension of a gap between the opening side surface 45a of the groove 45 and the end surface 22a1 around the opening of the holding hole 22a in the arm 22, into which the snap ring 60x is fitted. The groove portion dimension w2 is a dimension of a gap between the opening side surface 45a of the groove 45 and the end surface 23a1 around the opening of the holding hole 23a in the arm 23 into which the snap ring 60x is fitted. The groove portion dimensions w1 and w2 may be measured using any measurement instrument without limitation to the vernier caliper.

The snap ring selecting step S22 involves substituting the bearing cup gap $\alpha 0$ and groove portion dimensions w1 and w2 acquired as described above into an expression tx=(($\alpha 0$+w1+w2)/2) to calculate the plate thickness tx of the snap ring 60x to be selected. For example, when (($\alpha 0$+w1+w2)/2)=60 μm, two of the plurality of snap rings 60x prepared for assembly are selected which have a plate thickness tx closest to 60 μm. The snap rings 60x prepared have plate thicknesses in increments of, for example, 20 μm.

Figure 9:
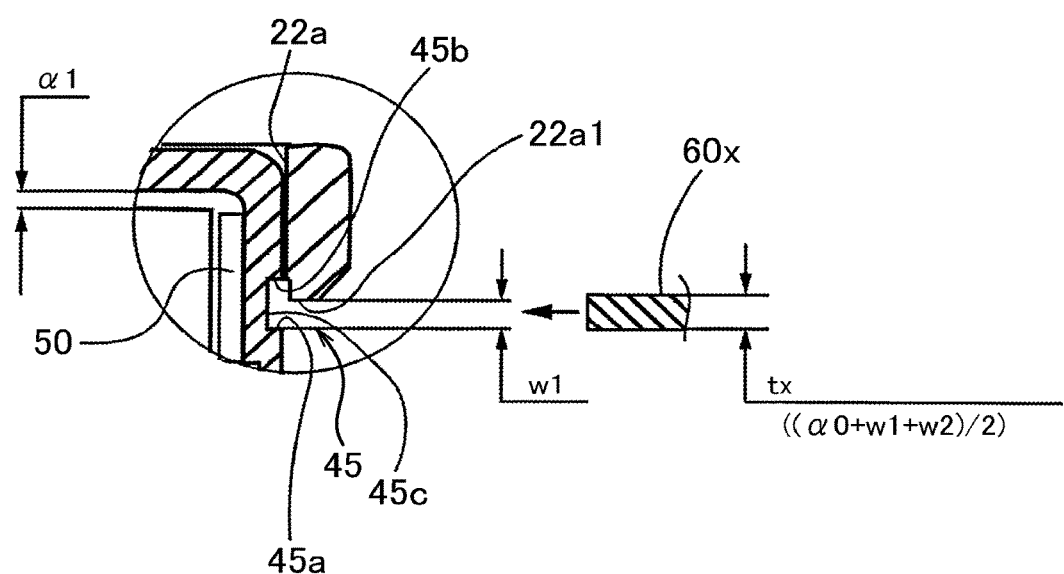
FIG. 9 is an enlarged view of a part T in FIG. 8.

In the snap ring assembling step S24, the snap rings are fitted between the end surface 22a1 around the opening of the holding hole 22a and the opening side surface 45a of the groove 45 and between the end surface 23a1 around the opening of the holding hole 23a and the opening side surface 45a of the groove 45 as depicted in FIG. 9. In this case, the plate thickness tx of the snap ring 60x is slightly larger than the groove portion dimensions w1 and w2. Thus, when the snap ring 60x is fitted between the end surface 22a1 or 23a1 and the opening side surface 45a of the groove 45, the bearing cup 40 is shifted in the press fitting direction. In other words, the bottom surface 42a of the bearing cup 40 moves toward the end surface 32a of the shaft portion 32 to eliminate the gap between the bottom surface 42a of the bearing cup 40 and the end surface 32a of the shaft portion 32, allowing backlash to be appropriately absorbed. The bearing cup 40 is also restrained from moving away from the shaft portion 32.

As is apparent from the above description, the measuring method for the bearing cup gap $\alpha 0$ (=$\alpha 1+\alpha 2$) in the universal joint 10 involves measuring, with the snap rings 60x of the universal joint 10 unassembled, the gaps between the bottom surfaces 42a of the bearing cups 40 and the joint spider member 30 included in the universal joint 10, according to the above-described embodiment.

The universal joint 10 includes the yoke member 20, the pair of bearing cups 40, the joint spider member 30, and the snap rings 60x. The yoke member 20 includes the yoke main body portion 21 and the pair of arms 22 and 23 extending in a bifurcated manner from the yoke main body portion 21 and having the holding holes 22a and 23a, respectively. The bearing cups 40 are shaped like bottomed tubes with grooves 45 on their respective outer peripheral surfaces, and are press-fitted into holding holes 22a and 23a such that the openings of the bearing cups 40 face each other. The joint spider member 30 has the pair of shaft portions 32 and 32 over which the bearing cups 40 are fitted. The snap rings 60x are fitted into the grooves 45.

The method for measuring the bearing cup gap includes a step of acquiring the first relationship data that indicates the relationship between the first pressing load F1 and the first deformation amount of the arms 22 and 23 when, with the yoke member 20 alone, the first pressing load F1 is applied to the arms 22 and 23 in the approaching direction in which the arms 22 and 23 approach each other so that the arms 22 and 23 are subjected to elastic bending deformation (first relationship data acquiring step S181), a step of acquiring the second relationship data that indicates the relationship between the second pressing load F2 and the second deformation amount of the bearing cups 40 when, with the bearing cups 40 fitted over the shaft portions 32 and with the yoke member 20 and the snap rings 60x unassembled, the second pressing load F2 is applied to the bearing cups 40 in the approaching direction in which the bearing cups 40 approach each other so that the joint spider member 30 and the bearing cups 40 are subjected to elastic compressive deformation (second relationship data acquiring step S182), a step of acquiring the displacement amount P of the bearing cups 40 when, with the yoke member 20, the bearing cups 40, and the joint spider member 30 assembled and with the snap rings 60x unassembled, the third pressing load F3 is applied to the bearing cups 40 in the approaching direction in which the bearing cups 40 approach each other (bearing cup displacement amount measuring step S16, displacement amount acquiring step S183), and a step of calculating the gaps (bearing cup gaps) between the bottom surfaces 42a of the bearing cups 40 and the end surfaces 32a of the shaft portions 32 based on the first relationship data, the second relationship data, and the displacement amount P (bearing cup gap measuring step S18, detailed steps S181 to S184).

As described above, in the universal joint 10 in which only the snap rings 60x are unassembled, the gaps $\alpha 1$ and $\alpha 2$ (bearing cup gaps) between the bottom surfaces 42a of the bearing cups 40 and the end surfaces 32a of the shaft portions 32 of the joint spider member 30 are measured. Thus, the elastic bending deformation data on the arms 22 and 23 alone (first relationship data) and the elastic compressive deformation data on the joint spider member 30 and the bearing cups 40 (second relationship data) are acquired. Then, the bottom portions 41 of the bearing cups 40 are actually pressed with the third pressing load F3, and the resultant displacement amounts P of the arms 22 and 23 and the joint spider member 30 and the bearing cups 40 are measured.

In this case, the displacement amount P includes the bending deformation amount of the arm 22 and 23 (first relationship data), the compressive deformation amount of the joint spider member 30 and the bearing cups 40 (second relationship data), and the gaps $\alpha 1$ and $\alpha 2$ between the bottom surfaces 42a of the bearing cups 40 and the end surfaces 32a of the joint spider member 30. Therefore, the bearing cup gaps $\alpha 1$ and $\alpha 2$ between the bottom surfaces 42a of the bearing cups 40 and the joint spider member 30 can be accurately determined by subtracting the bending deformation amount of the arms 22 and 23 and the compressive deformation amount of the joint spider member 30 and the bearing cups 40 from the displacement amount P. Such a measuring method based on the first relationship data, the second relationship data, and the measured displacement amount P allows accurate and easy determination of the bearing cup gaps $\alpha 1$ and $\alpha 2$ between the bottom surfaces 42a of the bearing cups 40 and the joint spider member 30.

According to the above-described embodiment, the calculation step S184 involves linearly approximating the acquired group of first relationship data to calculate the first line L1 (Y=a1X). The calculation step S184 also involves linearly approximating the acquired group of second relationship data to calculate the second line L2 (y=a2X). More specifically, the second line L2 is calculated in order to determine the gradient a2 of the second line L2. Then, the calculation step S184 calculates the third line L3 (y=a2X+b) having the gradient a2 and passing through the point (F3, P) on the graph in FIG. 10 resulting from plotting of the third pressing load F3 and the acquired displacement amount P.

Moreover, the calculation step S184 involves calculating the intersection point Z between the calculated third line L3 (y=a2X+b) and the calculated first line L1 (y=a1X). In this case, the Y coordinate of the intersection point Z in FIG. 10 is the bearing cup gap $\alpha 0$ (=$\alpha 1$+$\alpha 2$) resulting from the release of the third pressing load F3. Such an easy method allows the bearing cup gaps to be accurately determined.

In the method for manufacturing a universal joint according to the above-described embodiment, the universal joint 10 is manufactured by using the above-described method for measuring a bearing cup gap to measure the gaps between the bottom surfaces 42a of the bearing cups 40 and the end surfaces 32a of the shaft portions 32, selecting the plate thickness tx of the snap rings 60x based on the measured gaps, and fitting the selected snap rings 60x into the grooves 45.

As described above, the gap between the bottom surface 42a of the bearing cup 40 and the joint spider member 30 can be accurately and quickly determined, and the snap rings 60x with the appropriate plate thickness tx can be selected and quickly fitted into the grooves 45. Consequently, it is possible to manufacture the high-precision universal joint 10 at low cost.

Figure 11:
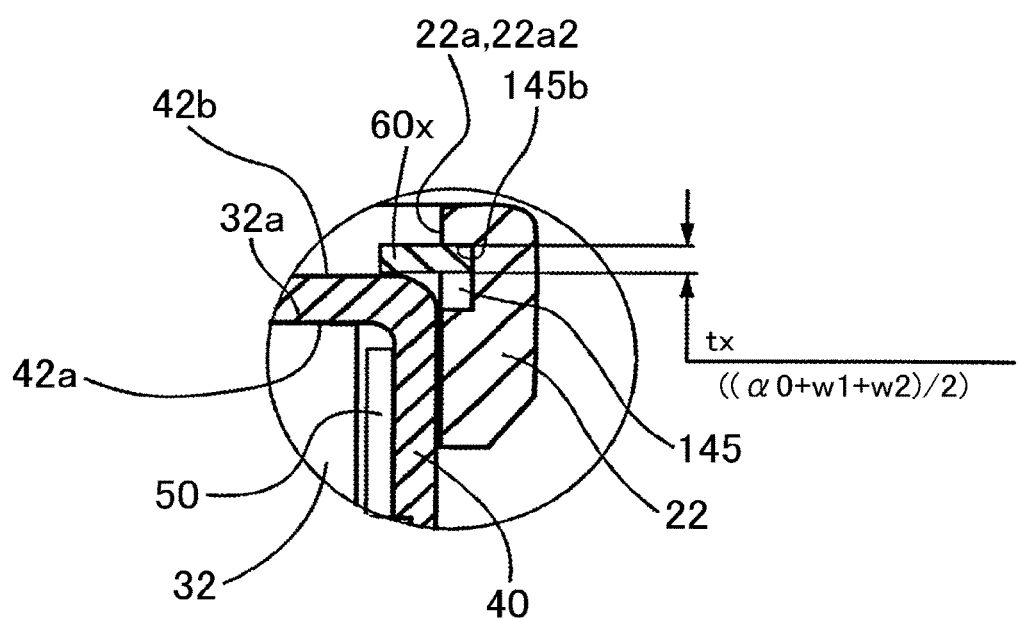
FIG. 11 is a diagram of another embodiment that is similar to FIG. 3.

Another embodiment that is a variation of the above-described embodiment will be described. In the above-described embodiment, the universal joint 10 includes the grooves 45 in the outer peripheral surfaces of the bearing cups 40 and is manufactured by fitting the snap rings 60x with the selected plate thickness tx between the opening side surface 45a of the groove 45 and the end surface 22a1 of the arms 22 and between the opening side surface 45a of the groove 45 and the end surface 23a1 of the arm 23. However, the present invention is not limited to this. In the variation, grooves 145 into which the snap rings 60x are fitted may be formed in inner peripheral surfaces 22a2 and 23a3 of the holding holes 22a and 23a in the arms 22 and 23, as depicted in FIG. 11 corresponding to FIG. 3 of the above-described embodiment. The arm 23 is not illustrated in FIG. 11, and only the arm 22 will be described. The configuration except for the above-described part thereof is similar to the configuration of the above-described embodiment, and similar members are denoted by the same reference numerals.

Specifically, the snap ring 60x with the plate thickness tx is fitted between a bottom portion side surface 145b of a groove 145 and the end surface 42b of the bearing cup 40 as depicted in FIG. 11. The snap ring 60x is selected based on the bearing cup gap $\alpha 0$ and the groove portion dimensions w1 and w2 measured using the measuring method according to the above-described embodiment. Thus, effects similar to the effects of the above-described embodiment are produced.

In another embodiment, when the snap ring 60x is fitted into the groove 145, a dedicated tool is used to grab opposite ends of separated portions of the snap ring 60x and to make the ends closer to each other to reduce the diameter of the snap ring 60x. The snap ring 60x with the reduced diameter maintained is inserted into the holding hole 22a and thus into the groove 145. Then, the tool is released to allow the snap ring 60x to return to the original diameter for assembly.

In the above-described embodiment and variation, the displacement amount P of the bearing cups 40 is acquired in the bearing cup displacement amount measuring step S16.

However, the present invention is not limited to this. In the bearing cup displacement amount measuring step S16, the displacements of the relative positions of the bearing cups 40 may be measured. This also allows similar effects to be produced.

What is claimed is:

1. A method for manufacturing a universal joint, the universal joint including: a yoke member including a yoke main body portion and a pair of arms extending in a bifurcated manner from the yoke main body portion and each having a holding hole formed therein; a pair of bearing cups shaped like bottomed tubes and press-fitted into the holding holes such that openings of the bearing cups face each other; a joint spider member with a pair of shaft portions supported by the bearing cups so as to be able to swing; grooves formed in inner peripheral surfaces of the holding holes in the arms or in outer peripheral surfaces of the bearing cups; and snap rings fitted into the grooves to restrain the bearing cups from moving away from the joint spider member, the manufacturing method comprising:

measuring gaps between bottom surfaces of the bearing cups and end surfaces of the shaft portions by acquiring first relationship data that indicates a relationship between a first pressing load and a first deformation amount of the arms when, with the yoke member alone, the first pressing load is applied to the arms in an approaching direction in which the arms approach each other so that the arms are subjected to elastic bending deformation; acquiring second relationship data that indicates a relationship between a second pressing load and a second deformation amount of the joint spider member and the bearing cups when, with the bearing cups fitted over the shaft portions, the second pressing load is applied to the bearing cups in an approaching direction in which the bearing cups approach each other so that the joint spider member and the bearing cups are subjected to elastic compressive deformation; acquiring a displacement amount of the bearing cups when, with the bearing cups and the joint spider member assembled to the yoke member, a third pressing load is applied to the bearing cups in the approaching direction; and calculating gaps between the bottom surfaces of the bearing cups and end surfaces of the shaft portions based on the first relationship data, the second relationship data, and the displacement amount of the bearing cups; and selecting a plate thickness for the snap rings based on the measured gaps and fitting the snap rings into the grooves to manufacture the universal joint.

2. The method for manufacturing a universal joint according to claim 1, wherein the step of calculating gaps comprises, in a graph representing the pressing load on an axis of abscissas and the deformation amount and the displacement amount on an axis of ordinate, linearly approximating a group of the first relationship data to calculate a first line;

linearly approximating a group of the second relationship data to calculate a second line and calculating a gradient of the second line;

calculating a third line having the same gradient as the second line and passing through a point obtained by plotting on the graph the displacement amount resulting from application of the third pressing load; and calculating an intersection point between the first line and the third line, which corresponds to the bearing cup gap resulting from release of the third pressing load.

3. A method for manufacturing a universal joint, the universal joint including: a yoke member including a yoke main body portion and a pair of arms extending in a bifurcated manner from the yoke main body portion and each having a holding hole formed therein; a pair of bearing cups shaped like bottomed tubes and press-fitted into the holding holes such that openings of the bearing cups face each other; a joint spider member with a pair of shaft portions supported by the bearing cups so as to be able to swing; grooves formed in inner peripheral surfaces of the holding holes in the arms; and snap rings fitted into the grooves to restrain the bearing cups from moving away from the joint spider member, the manufacturing method comprising:

measuring gaps between bottom surfaces of the bearing cups and side surfaces of the grooves by acquiring first relationship data that indicates a relationship between a first pressing load and a first deformation amount of the arms when, with the yoke member alone, the first pressing load is applied to the arms in an approaching direction in which the arms approach each other so that the arms are subjected to elastic bending deformation; acquiring second relationship data that indicates a relationship between a second pressing load and a second deformation amount of the joint spider member and the bearing cups when, with the bearing cups fitted over the shaft portions, the second pressing load is applied to the bearing cups in an approaching direction in which the bearing cups approach each other so that the joint spider member and the bearing cups are subjected to elastic compressive deformation; acquiring a displacement amount of the bearing cups when, with the bearing cups and the joint spider member assembled to the yoke member, a third pressing load is applied to the bearing cups in the approaching direction; and calculating gaps between the bottom surfaces of the bearing cups and end surfaces of the shaft portions based on the first relationship data, the second relationship data, and the displacement amount of the bearing cups; and selecting a plate thickness for the snap rings based on the measured gaps and fitting the snap rings into the grooves to manufacture the universal joint.

4. The method for manufacturing a universal joint according to claim 3, wherein the step of calculating gaps comprises, in a graph representing the pressing load on an axis of abscissas and the deformation amount and the displacement amount on an axis of ordinate, linearly approximating a group of the first relationship data to calculate a first line;

linearly approximating a group of the second relationship data to calculate a second line and calculating a gradient of the second line;

calculating a third line having the same gradient as the second line and passing through a point obtained by plotting on the graph the displacement amount resulting from application of the third pressing load; and calculating an intersection point between the first line and the third line, which corresponds to the bearing cup gap resulting from release of the third pressing load.

* * * * *